Patented Oct. 2, 1951

2,569,527

UNITED STATES PATENT OFFICE 2,569,527

CAKEMAKING

Norman F. Johnston, East Norwalk, Conn., assignor to R. T. Vanderbilt Co., Inc., New York, N. Y., a corporation of New York No Drawing. Application March 3, 1948, Serial No. 12,899

13 Claims. (Cl. 99—92)

My invention concerns a surface active composition having particular utility in cake making.

Surface active agents have long been employed in cake production for the purpose of lessening shrinkage in cakes prepared from batters containing a high proportion of shortening or sugar, or both. My composition differs from the conventional agents in that it serves primarily to tenderize the cake, rather than to increase its structural strength. It has little, if any, effect on the shrinking tendency of cakes containing both sugar and shortening in higher proportions. This follows from the fact that it supplements or magnifies the tenderizing action of sugar and shortening. If my composition is used in a cake batter of high sugar content, the shortening content must be relatively low. Conversely, if the composition is used in a batter of high shortening content, then the sugar content must be relatively low, i. e. the weight of the sugar must not substantially exceed the weight of the flour used. In egg cakes my composition performs best where the formula calls for whole eggs rather than egg whites.

The tenderizing action of my composition is accompanied by a whipping ability which permits of a degree of aeration of cake batters not heretofore obtainable. Cakes prepared with the composition are distinguished by their lightness and greater volume and by their fine cellular structure. Unlike cakes produced using large amounts of baking powder to increase volume, there is no opening up of the cell structure with consequent coarsening of the grain or texture.

Apart from its primary advantages, I have found that my composition reduces the staling rate of cakes. Thus, aged cakes have a better flavor and feel more moist and softer in the mouth.

My composition, due to its peculiar whipping and emulsifying properties, affords an entirely new kind of sponge cake. Sponge cakes, as heretofore produced, while possessing high volume in proportion to weight are rather tough and chewey on eating and stale rapidly. Moreover, their production requires careful control both as to materials used and the procedural steps followed. My composition greatly improves the texture of sponge cakes without decreasing volume, indeed the volume and lightness of the cake is increased and these improvements are accompanied by the usual decreased staling rate. Just as important as the changes effected in the nature of the cake, is the simplification of procedure to be hereinafter described made possible by employment of my composition.

A still further advantage of my composition resides in the fact that through its use cakes can be made "rich" economically. A given cake formula is normally made richer by increasing both the eggs and shortening and decreasing the liquid milk content to compensate for the extra liquid added through the medium of the eggs. Since eggs and shortening are by far the most expensive of cake ingredients, such a procedure is manifestly an expensive one. Employing my composition it is possible to attain the short, tender eating characteristics of rich cakes by increasing only the concentration of the eggs without at the same time increasing the amount of shortening.

Although my composition is particularly valuable when used in conjunction with emulsifying hydrogenated vegetable oils, it can be used with hydrogenated vegetable oils containing no emulsifying agents and can even be used in the production of lard-shortened cakes which are unusually light and palatable. Heretofore lard has not been generally used in commercial cake baking because it renders the batter difficult of aeration.

Similarly, my composition improves the creaming ability of butter by allowing for the incorporation of more air in butter-containing batters. Butter imparts a highly desirable flavor to cakes but its inability to aerate batters sufficiently to give light fine-grained cakes has presented a drawback. This limitation can be overcome by the use of my composition.

The composition of my invention is a paste-like mass having a consistency approaching that of hydrogenated vegetable oils employed in the baking art and is prepared by the hydration of a mixture of sorbitan monostearate and an activator for the sorbitan monostearate. The activator may be a condensate of ethylene oxide and a fatty acid containing from 12 to 18 carbon atoms, including hydroxy acids as dihydroxy stearic acid, a condensate of ethylene oxide and the monosorbitan of such an acid or a condensate of ethylene oxide and castor oil. These condensates do not serve merely to emulsify the sorbitan monostearate in the water employed in the hydration. Any number of surface active agents will accomplish that. Rather, they impart to the sorbitan monostearate the peculiar emulsifying and whipping properties, hereinbefore referred to, which give the improved cakes. The production of the condensates forms no part of my invention being described, for example, in U. S. Patents Nos. 1,959,930 and 1,970,578.

The proportion of ethylene oxide in the activator varies depending on the particular fatty component. Where the fatty component is one of the fatty acids, the activator should contain from 70 to 130 moles of ethylene oxide for each mole of acid. Where the fatty material is a monosorbitan, as sorbitan monostearate or sorbitan monolaurate, the activator should contain ethylene oxide and the monosorbitan in a molar ratio within the range 10:1 to 30:1. In the series of ethylene oxide condensation products of castor oil, those in which the molar ratio of ethylene oxide and castor oil lies within the range 70:1 to 150:1 are applicable to the invention.

The proportion of activator used depends on the presence or absence of sodium stearate in the sorbitan monostearate. Where from 0.2 to 0.5% of sodium stearate is present as little as 2–4% of the activator on the weight of the sorbitan monostearate may be sufficient. On the other hand, if the sorbitan monostearate is free of sodium stearate up to 40% of activator on the same basis may be required. Sorbitan monostearate containing as much as 1.0% sodium stearate may be used in the practice of my invention. More than 15% of the activator is seldom necessary where the sorbitan monostearate contains sodium stearate.

My preferred composition is prepared by melting together 94 parts by weight of sorbitan monostearate containing 0.5% sodium stearate and 6 parts by weight of an ethylene oxide-sorbitan monostearate condensate containing ethylene oxide and sorbitan monostearate in 20:1 ratio. To the melted mixture is added 5 parts by weight of boiling water and the whole mass stirred while gradually cooling until the desired smooth paste is obtained. If a condensate of ethylene oxide and stearic acid in which the ethylene oxide-stearic acid molar ratio is 100:1 or a condensate of ethylene oxide and sorbitan monolaurate in which the ethylene oxide-sorbitan monolaurate molar ratio is 20:1 is substituted for the ethylene oxide-sorbitan monostearate condensate a substantially equivalent paste results. A substantially equivalent paste is also achieved by adding 3 parts by weight of boiling water, with stirring, to a mixture produced by melting together 97 parts by weight of sorbitan monostearate containing 0.5% sodium stearate and 3 parts by weight of an ethylene oxide-castor oil condensate in which the molar ratio of ethylene oxide and castor oil is 127:1.

Where the sorbitan monostearate contains sodium stearate in the proportions which have been indicated, i. e. 0.2 to 1.0%, the melted mixture of sorbitan monostearate and activator may be sprayed into a chamber or tower to produce an easily-handled granular powder which is as readily hydrated as the mixture in mass form.

Using sorbitan monostearate which is free of sodium stearate, a highly effective paste is prepared by melting 80 parts by weight of the sorbitan monostearate with 20 parts by weight of ethylene oxide-sorbitan monostearate condensate containing ethylene oxide and sorbitan monostearate in 20:1 ratio. To this melted mixture only 2 parts by weight of boiling water are required to obtain a satisfactory consistency in the hydrated product.

In the case of cakes containing emulsifying shortening, my composition is best used at the rate of one pound of the non-aqueous paste solids for each one hundred pounds of flour or flour and cocoa. In the case of cakes prepared from non-emulsifying shortening, e. g. hydrogenated vegetable oils, butter or lard, it is advisable to employ about twice as much of the composition, that is an amount such that there will be two pounds of non-aqueous paste solids for each one hundred pounds of flour or flour and cocoa. Generally, where the formula calls for more sugar than flour, it is advantageous from the standpoint of avoiding excessive tenderness in the cake to use not more than thirty-five pounds of shortening per hundred pounds of flour. This applies regardless of the type of shortening used.

As has been brought out hereinbefore, a major advantage of my composition resides in the fact that it permits the incorporation of more air in the cake batter. In order to fully realize this advantage, the fluidity of the batter during the aerating stage must be properly controlled. If the batter is too fluid, satisfactory aeration will not be obtained. Also, if the batter is so viscous that it tears and shreds with mixing it will not take up the maximum amount of air. Excellent results have been obtained by observing the following simple mixing procedure: Mix all the dry cake materials including the whipping and emulsifying composition at low speed with sixty pounds of liquid milk for every one-hundred pounds of flour, or flour and cocoa. This will serve to break up and disperse the shortening throughout the mixture. Then add twenty-five pounds of liquid milk for every one-hundred pounds of flour, or flour and cocoa. If the formula contains less liquid milk than this amount, make up the difference in weight with eggs. Mix to maximum volume; add the remainder of the liquids gradually; and mix a final five minutes. Mixing throughout should be at low or medium speed, whichever gives the greatest aeration on a particular mixing machine with the flat type paddle or beater.

As I have stated, my composition greatly simplifies the production of sponge cakes. Following the conventional method, all the eggs and an equal weight of sugar plus the salt are warmed to 115° F. and whipped with a wire whip at a moderately fast speed in a vertical mixer. Approximately twenty minutes are required for a substantial batch of eggs and sugar to whip up to proper lightness. Thereafter, the rest of the sugar is dissolved in the milk, which has been warmed to 115° F., and gradually added to the beaten eggs with slow stirring, the stirring being continued just long enough to achieve thorough distribution of the milk and sugar with the eggs. The flour and baking powder are subsequently added together under slow stirring over a period of from one-half to one minute. In contrast to this tedious and painstaking method, my composition makes it possible to mix together initially all of the cake ingredients except the baking powder which is subsequently stirred in at moderate speed over a period of about one minute after the other ingredients have been whipped to maximum volume. It is not necessary to warm any of the materials since they may be used at room temperature or cold.

Various aspects of my invention are illustrated by the following examples which are not to be taken as in any way limiting the scope thereof:

*Example I*

4 parts by weight of sorbitan monostearate, free of sodium stearate, and one part by weight of the condensation product of sorbitan monostearate and ethylene oxide containing 20 moles of ethylene oxide for each mole of sorbitan monostearate are separately charged to two jacketed kettles and heated to a temperature of about 160° F. Sodium propionate is dissolved in water in a third jacketed kettle in a proportion sufficient to provide the desired concentration of preservative in the final product, usually 0.35%. The sorbitan monostearate and the ethylene oxide-sorbitan monostearate condensate together with the aqueous sodium propionate solution, the latter being heated to about 145° F., are pumped from the three kettles through a suitable mixer at rates regulated to produce a mixed product containing 28% by weight of sorbitan monostearate, 7% of the condensation product and 65% of aqueous sodium propionate solution. The mixture is cooled to about 105° F. as it passes through the mixer. 5 to 10% by volume of air may be incorporated in the mixture during the mixing operation. The cooled mixture has much the appearance of hydrogenated vegetable oil shortening.

The final product is used as indicated below to produce a yellow layer cake. The formula gives a batter having a specific gravity of 0.78 to 0.82 as opposed to a specific gravity of from 0.93 to 1.0 without the composition resulting in a 15 to 25% volume increase in the cake.

| Procedure | Formula | | |
|---|---|---|---|
| | | Grams | |
| Mix 2 minutes at low speed. | Flour | 300 | (100) |
| | Sugar | 300 | (100) |
| | Shortening (regular hydrogenated vegetable oil). | 60 | (20) |
| | Salt | 6 | (2) |
| | Baking Powder | 15 | (5) |
| | Milk | 180 | (60) |
| Add gradually and mix 8 minutes at moderate speed. | Milk | 75 | (25) |
| Add gradually and mix 5 minutes at moderate speed. | Milk | 60 | (20) |
| | Whole eggs | 75 | (25) |

Bake 10 oz. portions in 8 inch round pans for 17 minutes at 400° F.

Example II 94 parts by weight of sorbitan monostearate, containing a small amount, less than 1%, of sodium stearate, and 6 parts by weight of the condensation product of ethylene oxide and sorbitan monostearate containing 20 moles of ethylene oxide for each mole of sorbitan monostearate are melted and sprayed into a tower. 20 pounds of the granular powder thus obtained are added to 40 pounds of boiling water and the mixture slowing stirred in a cake mixer for five minutes. Thereafter, 60 pounds of cold water are added and the stirring continued for an additional five minutes. The paste thus produced gives a 10 to 20% volume increase when used in the production of a yellow layer cake of the formula indicated below. The formula gives a batter having a specific gravity of about 0.63 compared with 0.70 to 0.90 without the composition. In the absence of the composition, 70 pounds of shortening per hundred pounds of flour rather than 35 pounds per hundred of flour would be required to achieve comparable tenderness.

| Procedure | Formula | | |
|---|---|---|---|
| | | Grams | |
| Mix 2 minutes at low speed. | Flour | 300 | (100) |
| | Sugar | 420 | (140) |
| | Shortening (regular hydrogenated vegetable oil) | 105 | (35) |
| | Salt | 9 | (3) |
| | Baking Powder | 18 | (6) |
| | Milk | 180 | (60) |
| | Composition | 36 | (12) |
| Add gradually and mix 8 minutes at moderate speed. | Milk | 75 | (25) |
| Add gradually and mix 5 minutes at moderate speed. | Milk | 30 | (10) |
| | Whole Eggs | 270 | (90) |

Bake 12 oz. of batter in an 8 inch round pan for 25 minutes at 375° F.

Example III

A mixture produced by melting together 94 parts by weight of sorbitan monostearate containing less than 1% of sodium stearate and 6 parts by weight of the condensation product of ethylene oxide and stearic acid, in which the ethylene oxide-stearic acid molar ratio is 100:1, is stirred slowly with 5 parts by weight of boiling water. The paste which forms on cooling of the mixture is used in the production of a yellow pound cake displaying the usual improvements.

| Procedure | Formula | | |
|---|---|---|---|
| | | Grams | |
| Mix 2 minutes at low speed. | Flour | 1,000 | (100) |
| | Sugar | 1,200 | (120) |
| | Shortening (emulsifying type of hydrogenated vegetable oil). | 350 | (35) |
| | Salt | 40 | (4) |
| | Milk | 500 | (50) |
| | Composition | 60 | (6) |
| Add gradually and mix 8 minutes at moderate speed. | Milk | 200 | (20) |
| Add gradually and mix 5 minutes at moderate speed. | Whole Eggs | 700 | (70) |

Bake 4 pounds of batter in a wood-lined rectangular pan 21½ inches long x 6½ inches wide x 3½ inches deep for 85 minutes at 375° F.

Example IV 19 pounds and 6 ounces or sorbitan monostearate containing 0.5% sodium stearate and 10 ounces of an ethylene oxide-hydrogenated castor oil condensate containing the oxide and oil in a molar ratio of 125:1 are melted, under stirring, in a cake mixer with 40 pounds of boiling water. 60 pounds of cold water are then added with continued stirring. When used in the following devil's food layer cake formula, the composition thus produced gives a 23% volume increase.

| Procedure | Formula | | |
|---|---|---|---|
| | | Grams | |
| Mix 2 minutes at low speed. | Cocoa | 90 | (30) |
| | Flour | 300 | (100) |
| | Sugar | 420 | (140) |
| | Shortening (emulsifying type of hydrogenated vegetable oil). | 105 | (35) |
| | Salt | 12 | (4) |
| | Baking Powder | 15 | (5) |
| | Soda | 3.9 | (1.3) |
| | Milk | 210 | (70) |
| | Composition | 21.6 | (7.2) |
| Add gradually and mix 8 minutes at moderate speed. | Milk | 120 | (40) |
| Add gradually and mix 5 minutes at moderate speed. | Milk | 90 | (30) |
| | Whole Eggs | 195 | (65) |

Bake 12 oz. of batter in an 8 inch round pan for 18 minutes at 390° F.

Example V 32 pounds of sorbitan monostearate, containing a minor amount of sodium stearate, and 1 pound of the condensation product of ethylene oxide and unhydrogenated castor oil containing ethylene oxide in the molar ratio of 127:1 are stirred with 66 pounds of boiling water in a vertical cake mixer until the mixture is fairly cool and pasty. The paste is used in the following butter cake formula. The specific gravity of the batter is 0.67 compared with 0.75 without the composition. A 12% increase in the volume of the cake is realized.

| Procedure | Formula | | |
|---|---|---|---|
| | | Grams | |
| Mix 2 minutes at low speed. | Flour | 300 | (100) |
| | Sugar | 360 | (120) |
| | Butter | 105 | (35) |
| | Salt | 9 | (3) |
| | Baking Powder | 12 | (4) |
| | Milk | 180 | (60) |
| | Composition | 9 | (3) |
| Add gradually and mix 8 minutes at moderate speed. | Milk | 90 | (30) |
| Add gradually and mix 5 minutes at moderate speed. | Whole Eggs | 180 | (60) |
| | Vanilla | 0.3 | (0.1) |

Bake 10 oz. of batter in an 8 inch round pan for 22 minutes at 375° F.

*Example VI*

1 pound of sorbitan monostearate, free of sodium stearate, and ¼ pound of the condensation product of ethylene oxide and sorbitan monostearate containing ethylene oxide in a molar ratio of 20:1 are melted and stirred at low speed with 2½ pounds of boiling water in a vertical cake mixer until the mixture has cooled to 100° F. The paste is used in the following yellow layer cake formula. The batter possesses a specific gravity of 0.90 compared with a specific gravity of 1.14 when the composition is omitted. The cake displays the usual improvements in volume, grain, tenderness and eating qualities.

| Procedure | Formula | | |
|---|---|---|---|
| | | Grams | |
| Mix 2 minutes at low speed. | Flour | 300 | (100) |
| | Sugar | 360 | (120) |
| | Lard | 105 | (35) |
| | Salt | 9 | (3) |
| | Baking Powder | 12 | (4) |
| | Milk | 180 | (60) |
| | Composition | 9 | (3) |
| Add gradually and mix 8 minutes at moderate speed. | Milk | 90 | (30) |
| Add gradually and mix 5 minutes at moderate speed. | Whole Eggs | 180 | (60) |
| | Vanilla | 0.3 | (0.1) |

Bake 10 oz. of batter in an 8 inch round pan for 22 minutes at 375° F.

*Example VII*

The composition of Example I is used as follows to produce a sponge cake of greater volume and improved texture and tenderness. The batter has a specific gravity of 0.46 as opposed to 0.53 when the composition is omitted and the usual procedure followed.

| Procedure | Formula | | |
|---|---|---|---|
| | | Grams | |
| Mix at room temperature with wire whip at high speed until maximum volume is obtained. | Flour | 300 | (100) |
| | Sugar | 420 | (140) |
| | Milk | 240 | (80) |
| | Composition of Example I | 12 | (4) |
| | Salt | 3 | (1) |
| Mix in at moderate speed for 2 minutes. | Whole Eggs | 240 | (80) |
| | Baking Powder | 9 | (3) |

Bake 10 oz. of batter in an 8 inch round pan at 400° F. for 16 minutes.

This application is a continuation of my application Serial Number 732,921, filed March 6, 1947, now abandoned.

I claim:

1. A paste-like composition which consists essentially of sorbitan monostearate, a relatively smaller amount of an activator for the sorbitan monostearate and water, the activator being a condensate from the group consisting of condensates of ethylene oxides and fatty acids, including hydroxy acids, containing from 12 to 18 carbon atoms in which the molar ratio of ethylene oxide to acid is within the range 70:1 to 130:1, condensates of ethylene oxide and the monosorbitans of such acids in which the ethylene oxide-monosorbitan molar ratio is within the range 10:1 to 30:1 and condensates of ethylene oxide and castor oil in which the ethylene oxide-castor oil molar ratio is within the range 70:1 to 150:1.

2. A paste-like composition which consists essentially of sorbitan monostearate, water and from 2 to 40% on the weight of the sorbitan monostearate of a condensate from the group consisting of condensates of ethylene oxide and fatty acids, including hydroxy acids, containing from 12 to 18 carbon atoms in which the molar ratio of ethylene oxide to acid is within the range 70:1 to 130:1, condensates of ethylene oxide and the monosorbitans of such acids in which the ethylene oxide-monosorbitan molar ratio is within the range 10:1 to 30:1 and condensates of ethylene oxide and castor oil in which the ethylene oxide-castor oil molar ratio is within the range 70:1 to 150:1.

3. A paste-like composition which consists essentially of sorbitan monostearate containing from 0.2 to 1.0% of sodium stearate, water and from 2 to 15% on the weight of the sorbitan monostearate of a condensate from the group consisting of condensates of ethylene oxides and fatty acids, including hydroxy acids, containing from 12 to 18 carbon atoms in which the molar ratio of ethylene oxide to acid is within the range 70:1 to 130:1, condensates of ethylene oxide and the monosorbitans of such acids in which the ethylene oxide monosorbitan molar ratio is within the range 10:1 to 30:1 and condensates of ethylene oxide and castor oil in which the ethylene oxide-castor oil molar ratio is within the range 70:1 to 150:1.

4. A paste-like composition which consists essentially of sorbitan monostearate containing from 0.2 to 1.0% of sodium stearate, a condensate of ethylene oxide and sorbitan monostearate in which the ethylene oxide-sorbitan monostearate molar ratio is 20:1 and water, the weight of the condensate accounting for about 6% of the total weight of the condensate and sorbitan monostearate.

5. A paste-like composition which consists essentially of sorbitan monostearate containing from 0.2 to 1.0% of sodium stearate, a condensate of ethylene oxide and stearic acid in which the ethylene oxide-stearic acid molar ratio is 100:1 and water, the weight of the condensate accounting for about 6% of the total weight of the condensate and sorbitan monostearate.

6. A paste-like composition which consists essentially of sorbitan monostearate containing from 0.2 to 1.0% of sodium stearate, a condensate of ethylene oxide and castor oil in which the ethylene oxide-castor oil molar ratio is 127:1 and water, the weight of the condensate accounting for about 3% of the total weight of the condensate and sorbitan monostearate.

7. In cake making, the method of facilitating the incorporation of air into the cake batter which comprises adding to the batter an effective proportion of a hydrated mixture of sorbitan monostearate and a relatively smaller amount of an activator for the sorbitan monostearate, the activator being a condensate from the group consisting of condensates of ethylene oxides and fatty acids, including hydroxy acids, containing from 12 to 18 carbon atoms in which the molar ratio of ethylene oxide to acid is within the range 70:1 to 130:1, condensates of ethylene oxide and the monosorbitans of such acids in which the ethylene oxide monosorbitan molar ratio is within the range 10:1 to 30:1 and condensates of ethylene oxide and castor oil in which the ethylene oxide-castor oil molar ratio is within the range 70:1 to 150:1.

8. In cake making, the method of facilitating the incorporation of air into the cake batter which comprises adding to the batter an effective proportion of a hydrated mixture of bleached sorbitan monostearate and from 2 to 40% on the weight of sorbitan monostearate of a condensate from the group consisting of condensates of ethylene oxides and fatty acids, including hydroxy acids, containing from 12 to 18 carbon atoms in which the molar ratio of ethylene oxide to acid is within the range 70:1 to 130:1, condensates of ethylene oxide and the monosorbitans of such acids in which the ethylene oxide monosorbitan molar ratio is within the range 10:1 to 30:1 and condensates of ethylene oxide and castor oil in which the ethylene oxide-castor oil molar ratio is within the range 70:1 to 150:1.

9. In cake making, the method of facilitating the incorporation of air into the cake batter which comprises adding to the batter an effective proportion of a hydrated mixture of sorbitan monostearate containing from 0.2 to 1.0% of sodium stearate and from 2 to 15% on the weight of the sorbitan monostearate of a condensate from the group consisting of condensates of ethylene oxides and fatty acids, including hydroxy acids, containing from 12 to 18 carbon atoms in which the molar ratio of ethylene oxide to acid is within the range 70:1 to 130:1, condensates of ethylene oxide and the monosorbitans of such acids in which the ethylene oxide monosorbitan molar ratio is within the range 10:1 to 30:1 and condensates of ethylene oxide and castor oil in which the ethylene oxide-castor oil molar ratio is within the range 70:1 to 150:1.

10. In cake making, the method of facilitating the incorporation of air into the cake batter which comprises adding to the batter an effective proportion of a hydrated mixture of sorbitan monostearate containing from 0.2 to 1.0% of sodium stearate and an ethylene oxide-sorbitan monostearate condensate in which the molar ratio of ethylene oxide to sorbitan monostearate is 20:1, the condensate accounting for about 6% of the total weight of the condensate and the sorbitan monostearate.

11. In cake making, the method of facilitating the incorporation of air into the cake batter which comprises adding to the batter an effective proportion of a hydrated mixture of sorbitan monostearate containing from 0.2 to 1.0% of sodium stearate and an ethylene oxide-stearic acid condensate in which the molar ratio of ethylene oxide to stearic acid is 100:1, the condensate accounting for about 6% of the total weight of the condensate and the sorbitan monostearate.

12. In cake making, the method of facilitating the incorporation of air into the cake batter which comprises adding to the batter an effective proportion of a hydrated mixture of sorbitan monostearate containing from 0.2 to 1.0% of sodium stearate and an ethylene oxide-castor oil condensate in which the molar ratio of ethylene oxide to castor oil is 127:1, the condensate accounting for about 6% of the total weight of the condensate and the sorbitan monostearate.

13. A composition having the form of a granular powder which consists essentially of sorbitan monostearate containing from 0.2 to 1% of sodium stearate and from 2 to 15% on the weight of the sorbitan monostearate of a condensate from the group consisting of condensates of ethylene oxides and fatty acids, including hydroxy acids, containing from 12 to 18 carbon atoms in which the molar ratio of ethylene oxide to acid is within the range 70:1 to 130:1, condensates of ethylene oxide and the monosorbitans of such acids in which the ethylene oxide-monosorbitan molar ratio is within the range 10:1 to 30:1 and condensates of ethylene oxide and castor oil in which the ethylene oxide-castor oil molar ratio is within the range 70:1 to 150:1.

NORMAN F. JOHNSTON.

REFERENCES CITED

The following references are of record in the file of this patent:

UNITED STATES PATENTS

| Number | Name | Date |
|---|---|---|
| 1,906,207 | Blaikie | Apr. 25, 1933 |
| 2,132,396 | Coith | Oct. 11, 1938 |
| 2,132,417 | Harris | Oct. 11, 1938 |
| 2,422,486 | Johnson | June 17, 1947 |

OTHER REFERENCES

Atlas Spans and Atlas Tweens Industrial Chemical Dept., Atlas Powder Co., Wilmington, Del., June 1945, pp. 1-8, and 13.